United States Patent
Vogten

[19]

[11] Patent Number: 5,845,250
[45] Date of Patent: Dec. 1, 1998

[54] DEVICE FOR GENERATING ANNOUNCEMENT INFORMATION WITH CODED ITEMS THAT HAVE A PROSODY INDICATOR, A VEHICLE PROVIDED WITH SUCH DEVICE, AND AN ENCODING DEVICE FOR USE IN A SYSTEM FOR GENERATING SUCH ANNOUNCEMENT INFORMATION

[75] Inventor: Leonardus L.M. Vogten, Eindhoven, Netherlands

[73] Assignee: U.S. Philips Corporation, New York, N.Y.

[21] Appl. No.: 655,172

[22] Filed: May 30, 1996

[30] Foreign Application Priority Data

Jun. 2, 1995 [EP] European Pat. Off. ............ 95201453.8

[51] Int. Cl.⁶ ...................................................... G10L 3/00
[52] U.S. Cl. ............................................................. 704/270
[58] Field of Search .................................... 704/267, 270, 704/275

[56] References Cited

U.S. PATENT DOCUMENTS 4,862,513  3/1988  Bragas ........................................ 455/45
5,592,585  1/1995  Van Coile et al. ...................... 704/267

FOREIGN PATENT DOCUMENTS

0543459A2  5/1993  European Pat. Off. .......... G10L 5/02
WO9530882  11/1995  WIPO ............................ G01C 21/20

*Primary Examiner*—David R. Hudspeth
*Assistant Examiner*—Robert Louis Sax
*Attorney, Agent, or Firm*—Jack D. Slobod

[57] ABSTRACT

Fixed-format and coded control informations are received for generating announcements. The coded control informations select synthetic speech information items from a store. A speech generator under control of the control items forms a composite speech message. For a message containing both fixed items and variable items, fixed items are encoded in enriched phoneme notation. Variable items are encoded in straight phoneme notation. Items are provided in multiple versions. Each version has a respective different prosody pattern of pitch and/or rhythm of its phoneme sequence, and is selected by a multivalued context symbol adjoined or implicit to the associated control information element.

8 Claims, 8 Drawing Sheets

| | | | | | | | | | | | | | | | |
|---|---|---|---|---|---|---|---|---|---|---|---|---|---|---|---|
| 5 | Rt- | N: | | L- | r | L: | | | | | | | | | event |
| 6 | Rt- | N: | Rn. | L- | r | L: | | | | | | | | | event |
| 7 | Rt- | N: | | L- | r | L: | i | | | | | | | L: | event |
| 8 | Rt- | N: | | L- | r | L: | | | | | | S- | N: | | event |
| 9 | Rt- | N: | | L- | r | L: | | | | | | S- | | L: | event |
| 10 | Rt- | N: | | L- | r | L: | | | | | | S- | N- | L: | event |
| 11 | Rt- | N: | Rn. | L- | r | L: | i | | | | | | | L: | event |
| 12 | Rt- | N: | Rn. | L- | r | L: | | | | | | S- | N: | | event |
| 13 | Rt- | N: | Rn. | L- | r | L: | | | | | | S- | | L: | event |
| 14 | Rt- | N: | Rn. | L- | r | L: | | | | | | S- | N- | L: | event |
| 15 | Rt- | N: | | L- | r | L: | z | | | L: | u | | | L: | event |
| 16 | Rt- | N: | | L- | r | L: | z | | | L: | u | S- | N: | | event |
| 17 | Rt- | N: | | L- | r | L: | z | | | L: | u | S- | | L: | event |
| 18 | Rt- | N: | | L- | r | L: | z | | | L: | u | S- | N- | L: | event |
| 19 | Rt- | N: | | L- | r | L: | z | S- | N- | | u | | | L: | event |
| 20 | Rt- | N: | | L- | r | L: | z | S- | | L: | u | | | L: | event |
| 21 | Rt- | N: | | L- | r | L: | z | S- | N- | L: | u | | | L: | event |
| 22 | Rt- | N: | | L- | r | L: | z | S- | N- | | u | S- | N: | | event |
| 23 | Rt- | N: | | L- | r | L: | z | S- | N- | | u | S- | | L: | event |
| 24 | Rt- | N: | | L- | r | L: | z | S- | N- | | u | S- | N- | L: | event |
| 25 | Rt- | N: | | L- | r | L: | z | S- | | L: | u | S- | N: | | event |
| 26 | Rt- | N: | | L- | r | L: | z | S- | | L: | u | S- | | L: | event |
| 27 | Rt- | N: | | L- | r | L: | z | S- | | L: | u | S- | N- | L: | event |
| 28 | Rt- | N: | | L- | r | L: | z | S- | N- | L: | u | S- | N: | | event |
| 29 | Rt- | N: | | L- | r | L: | z | S- | N- | L: | u | S- | | L: | event |
| 30 | Rt- | N: | | L- | r | L: | z | S- | N- | L: | u | S- | N- | L: | event |
| 31 | Rt- | N: | Rn. | L- | r | L: | z | S- | N- | L: | u | | | L: | event |
| 32 | Rt- | N: | Rn. | L- | r | L: | z | S- | N- | | u | S- | N: | | event |
| 33 | Rt- | N: | Rn. | L- | r | L: | z | S- | N- | | u | S- | | L: | event |
| 34 | Rt- | N: | Rn. | L- | r | L: | z | S- | N- | | u | S- | N- | L: | event |
| 35 | Rt- | N: | Rn. | L- | r | L: | z | S- | | L: | u | S- | N: | | event |
| 36 | Rt- | N: | Rn. | L- | r | L: | z | S- | | L: | u | S- | | L: | event |
| 37 | Rt- | N: | Rn. | L- | r | L: | z | S- | | L: | u | S- | N- | L: | event |
| 38 | Rt- | N: | Rn. | L- | r | L: | z | S- | N- | L: | u | S- | N: | | event |
| 39 | Rt- | N: | Rn. | L- | r | L: | z | S- | N- | L: | u | S- | | L: | event |
| 40 | Rt- | N: | Rn. | L- | r | L: | z | S- | N- | L: | u | S- | N- | L: | event |

FIG. 5

DEVICE FOR GENERATING ANNOUNCEMENT INFORMATION WITH CODED ITEMS THAT HAVE A PROSODY INDICATOR, A VEHICLE PROVIDED WITH SUCH DEVICE, AND AN ENCODING DEVICE FOR USE IN A SYSTEM FOR GENERATING SUCH ANNOUNCEMENT INFORMATION

BACKGROUND TO THE INVENTION

The invention relates to a device for generating speech message information, said device comprising input means for receiving fixed-format and coded control information elements, a storage unit for storing synthetic speech information items that are selectable in sequence by said coded control information elements, and a speech generator for under control of said speech information items generating a composite speech message. The speech message may form part of an announcement system. A system of this kind has been disclosed in commonly owned U.S. Pat. No. 5,621,891, corresponding to EP-A-543,459, and herein incorporated by reference. The reference combines both natural recorded and synthetically generated speech items to produce messages with flexible content while requiring only moderate storage space. In this respect, the reference uses natural speech notwithstanding the associated relatively high storage requirements for producing speech elements that individually have a high occurrence frequency. In contradistinction thereto, synthetic speech generation is used at relatively low storage requirements for a larger set of speech elements that each occur relatively less often. The field of use of the reference is an announcement system for train connections and the like, wherein frequent elements are indications like 'delay', and 'departure platform', whereas the less frequent items are members of a large set of origin or destination stations.

There is presently a trend to broadcasting traffic information messages for use in motor cars and other road vehicles, which messages are accompanied by area codes, thereby allowing the car's control system to present only an appropriate selection from these messages to the driver. Furthermore, present day technology is going towards complete digitization of such systems, which for the present embodiment has led to the RDS-TMC (Radio Data System-Traffic Message Control) system. It would be advantageous if the broadcast messages would be formed as sequences of codes only.

SUMMARY TO THE INVENTION

Therefore, among other things, it is an object of the present invention to provide a device for generating speech message information, wherein the speech representation is fully digital, and wherein the prosodics of the resulting speech are both pleasing and clarity-enhancing. In consequence, according to one of its aspects, the invention is characterized in that for a message format containing both fixed items and variable items, such fixed items are encoded in enriched phoneme notation and each variable item is encoded as straight phoneme notation, together with lexical accents, and said items are provided to a listener in multiple versions that each have a respective different prosody pattern of pitch and/or rhythm of an associated phoneme sequence, as being selectable by a multivalued context symbol adjoined to or implicit in the associated control information element. The enriched phoneme encoding of fixed speech parts offers higher quality of speech output, and the straight phoneme encoding of other parts, associated with the usage of lexical accents, and the usage of respective different dynamic prosody patterns in respective versions as governed by the control information, provides a good trade-off. The enriched phoneme notation of fixed speech parts has been described in B. van Coile et al, PROTRAN: a Prosody Transplantation Tool for Text-to-speech Applications, International Conference for Speech and Language Processing (ICSLP94, Yokohama, J. P., P.423–426. Straight phoneme encoding, on the other hand, has been in wide use in the art of generating synthetic speech.

The invention also relates to a vehicle provided with such a system for generating speech and to an encoding device for use in a system for generating such announcement information. Various further advantageous aspects of the invention are recited in dependent claims.

BRIEF DESCRIPTION OF THE DRAWINGS

These and other aspects and advantages of the invention will be discussed more in detail with reference to preferred embodiments disclosed hereinafter, and in particular with reference to the appended Figures, that show:

FIG. 5 a table of various exemplary messages.

DETAILED DESCRIPTION OF PREFERRED EMBODIMENTS

Figure 1:
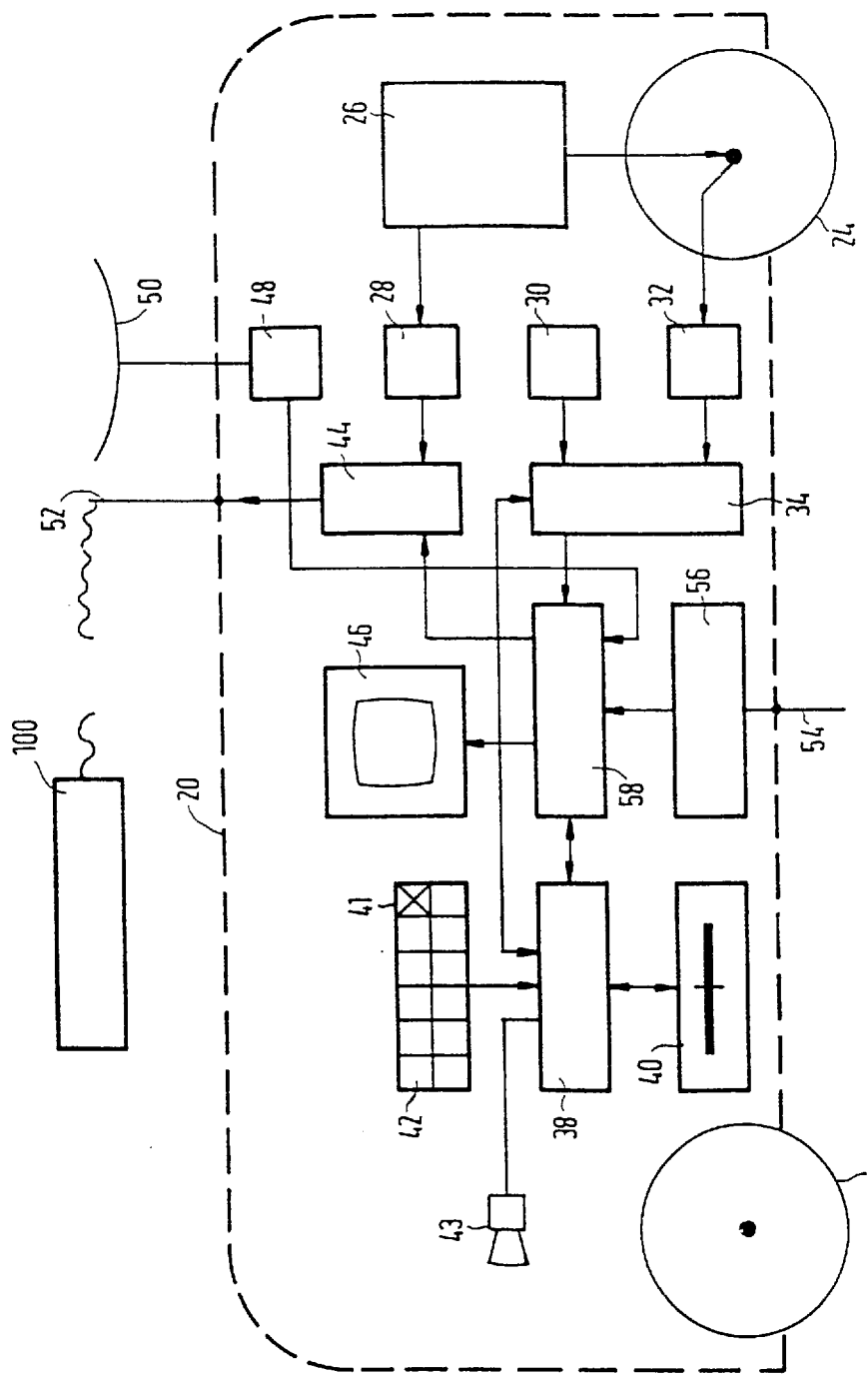
FIG. 1 a vehicle for use with the invention.

Hereinafter, first the principle of the invention is summarized, next an embodiment of the hardware facilities is described, and finally a sub-set of the data structure is given by way of example, from which a required full set can be readily constructed by skilled art persons. Now, in the RDS-TMC traffic information system, the messages are FM-broadcast by a central station in the form of code sequences, and subsequently received and decoded in the digital radio of a car in question. A filtering operation detects whether the message in question is indeed relevant for the driver. In the positive case, the message is presented as speech, either automatically, or upon request by the driver. The broadcast messages have a predefined structure of contents that has been internationally defined in Europe, and which is language-independent. For representing the contents, the messages are translated into carrier sentences that may be specific for respective languages. Such carrier sentences then have one or more fixed parts, such as particular events, that can be supplemented by open slots which must be filled with variable parts such as numbers and identifiers or names of locations. The amount of such names pertaining to a particular region or country is generally very great and in consequence, according to the invention they are broadcast as one or more codes in addition to the code of the carrier sentence.

The broadcast codes are used for addressing an in-car storage mechanism, that contains information for producing synthetic speech on the basis thereof. Now, in the latter storage, the fixed parts of a message may be coded in so called enriched phoneme notation. Various attributes, such as the prosody pattern defining pitch frequencies and dynamic variations thereof, and also the duration of various phoneme parts, can be explicitly indicated. The set of variable information, in particular the number of geographic names is generally too large for storing in the above enriched phoneme notation, so that therefor only the straight phoneme notation with lexical accents is available. In such case, the storage bears much resemblance to a dictionary. Now, in natural speech, both intonation and rhythm of the variable elements may vary strongly in dependence on the context in which these elements occur in the carrier sentence. For example, just before a syntactic boundary a particular geographic name may have quite a different time dependency in its pitch than if the same name is being followed by another geographic name. Therefore, the invention provides appropriate prosodics for many situations.

The solution is that in a message, each slot which must be filled contains a particular context symbol that indicates which one of a particular selection of pitch contour and phoneme duration adjustment or rhythm must be followed in speech synthesis. In this way, an easy manner of improving speech quality and intelligibility is provided. Such a system can be provided with correct intonation and timing in a simple manner. Of course, for certain variable items only a single version may need to be presented, depending on the actual traffic message contents.

FIG. 1 is an overall diagram of a device according to the invention as located within a more or less standard motor car that has been shown in a very schematic way only. Various subsystems may be omitted while still retaining full operativity in the context of the present invention. In fact, various parts of the Figure have been derived from earlier EP Patent Application 707 704, corresponding U.S. Pat. No. 5,598, 167. The car has a body 20, front wheels 22 and rear wheels 24 that are driven by a combination of motor and gearbox 26. The car has various facilities for determining its actual position. First, there is a compass 30. Second, there is one odometer 32 for each one of a pair of wheels. The combination of both odometer readings and the compass may be used in processor 34 to calculate direction and distance travelled. Likewise, the combination of disc antenna 50 and processor 48 may calculate actual vehicle position from GPS satellite wave patterns. Alternatively, antenna 54 may receive location codes from roadside beacons for processing in processor 56.

Block 40 is a CD-ROM player for geographical data. This data can be accessed by route planner processor 38 under selective control by user interface 42. Upon inputting of actual position and intended destination, processor 38 calculates an optimum route, indicates driver actions necessary thereto, and updates such in a view of actual route already travelled. Also, comparing map information to calculated position may correct or reset the latter to correspond to an on-road position. As is clear to skilled practitioners, a subset of the above suffices either to plan the route, by foregoing the route planning, allow to ascertain actual position.

Block 28 detects internal change of status of the vehicle, such as pertaining to driving or not, loading, and various others. Navigational changes of status are detected in central processor 58. This processor is connected to transmitter-receiver 44, to route planner processor 38, and to position detectors 34, 56.

Block 44 is a transmitter-receiver for a cellular broadcast system which has a limited range that is suited for the actual cell size that may amount to a few kilometers. Element 52 is the associated antenna that may be shared with other systems, such as radio, the traffic message system, and telephone. Messages pertaining to the vehicle itself may be sent to a central authority system 100, such as the police, a telephone exchange or a fleet management computer system. Messages that can be relevant to the vehicle or to its driver are likewise received at antenna 50 or 52 from such external authority or system, and according to the present invention are converted into speech on speech output means 43 that are actuated by human interface actuator means 41. Absent such actuation, the messages are stored as long as the system considers such relevant. Urgent messages may be outputted independently of user request.

Figure 2:
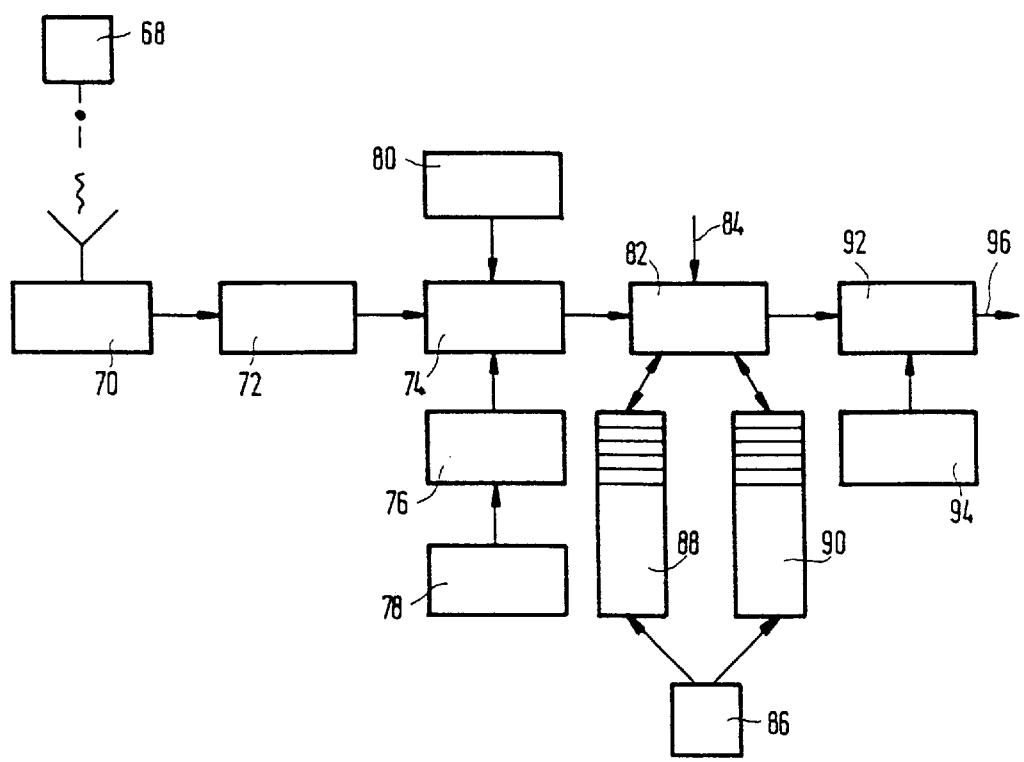
FIG. 2 a diagram of a device according to the invention.

FIG. 2 is a diagram of a device according to the invention. Block 68 represents the setting up of a message and subsequent broadcasting in some central station. Block 70 represents the subsequent reception of this message in the system of FIG. 1. Block 72 represents electronic processing thereof at the receiver, so that a message is generated as a bit train of predetermined format. According to the preferred embodiment, this bit train is independent of the intended representation language. Block 78 is the position-determination system of the vehicle that may operate according to the disclosure with respect to FIG. 1. From this determination, in block 76 the relevant cells from the set of cells that provide global coverage of the area are selected. Relevant cells are, first the actual cell where the vehicle is in, and furthermore, such future cells as are deemed relevant in view of driving speed and direction of moving, and possibly, those cells that may be selected along the actually planned road. Moreover, in block 80 actual status of the vehicle is detected. This status may be, for example, travelling fast or slow, standing still, cargo-related status such as loading, and emergency.

Under control of the selectional information from blocks 76 and 80, in block 74 a selection is made among the incoming messages from block 72. Messages found irrelevant are suppressed, while relevant messages are forwarded. Block 82 is the storage controller. Messages transmitted by block 74 are destructively written into memory in the sequence of arrival. The start of the sequence is indicated by a particular heading indicator. Each message may have a sequence number. Moreover, selection among memory blocks 88, 90 is according to time division multiplex. For example, timing control 86 periodically alternates activation between memory blocks 88, 90. The writing is in one block, reading is in the other. Upon reception of a read control signal on user input 84, the whole content of the 'read' module is read once. In block 92, the conversion to speech is effected. To this effect, IC-memory card 94 contains the language-specific phoneme symbols that are each associated with one unique item code read from memory 88/90, and which for the outputting of an audio message are then addressed in sequence. Subsequently, output 96 is fed to an amplifier-loudspeaker combination not shown.

Figure 3:
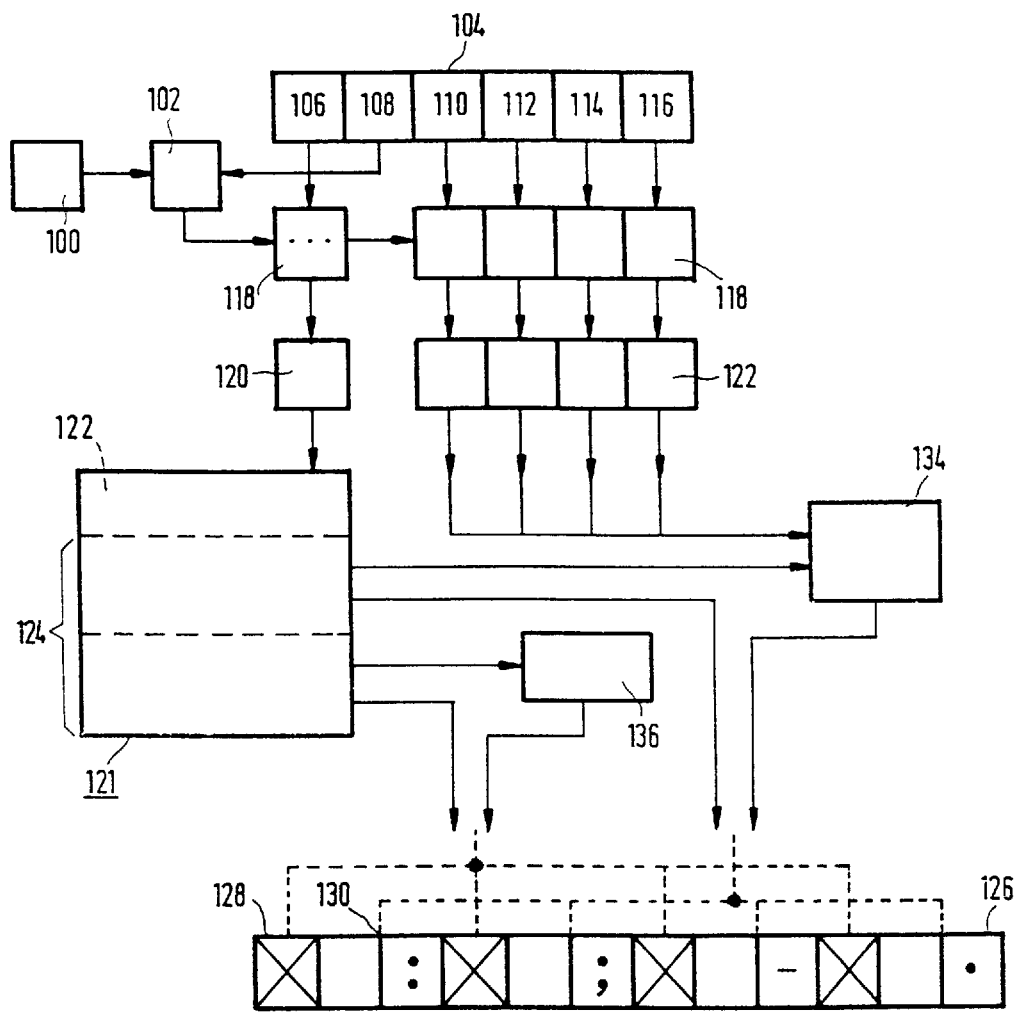
FIG. 3 a memory organization of such system.

FIG. 3 shows a memory organization of such a device. Block 104 is a reception register that contains the information as received by means of broadcast. Herein, block 106 contains the identifier of the message, block 108 the geography code of the message, blocks 110 through 116 the location codes for inserting into the announcement message to be outputted to the user. In block 102 the geography code of the message is compared to the actual location of the vehicle as presented from block 100 that symbolizes a location determination system as explained with reference to FIG. 1. For example, if the actual location is within a particular cell, the comparison only presents an O.K. signal if the actual cell is the same cell or an adjoining cell to the cell pertaining to the message. In similar way, the actual state of the vehicle may codetermine the generating of the O.K. signal. For example, if the vehicle is unloading, the adjoining cells will not give rise to an O.K.

The O.K. signal if generated, will render gate blocks 118 transmissive. Generally, the representation in FIG. 3 is functional, rather than physical. The control codes will now effectively be stored in storage unit 120, 122, that may form part of the memory modules 88, 90 in FIG. 2. When the speech must be produced, the message number in block 120 addresses directory 121; herein, the addressing is in part 122. Storage part 124 contains secondary control information for controlling the generation of the message, to wit, the positions of the various message slots, and for the fixed slots, the item code that must be filled in. The fixed item codes now address fixed item storage 136, wherein the items are stored in enriched phoneme representation. The variable item codes get from register 122 their message positions from the directory, inclusive of the associated prosody code, and their identifier. The prosody codes, in combination which the associated identifiers, address variable item storage 134, that for such variable items allows to form multiple versions of straight phoneme encoded representations. The outputted representations from storages 134 and 136 are sequenced in the correct manner in register 126, wherein the fixed parts have been indicated by crosses, variable parts by blank boxes, and context symbols by the suffixes to be discussed with reference to FIG. 4.

FIGS. 4a–4j show a set of standard patterns of timing and prosody. In the embodiment described, there are four different dynamic pitch patterns, each of which has been indicated hereinafter by an associated punctuation mark, as follows;

a. a full-stop dot . indicates the usage of a particular item in a normal sentence with terminates with a lowering of the pitch;

b. a semi-colon : indicates that accents are left out of the sentence which has a final pitch rise, indicating that something is to follow; the pitch rise is on an accentuated item;

c. a comma , indicates the maintaining of accents in the sentence with extra final pitch rise, indicating a kind of concatenation, while still maintaining a certain separation;

d. a horizontal strike—indicates only declination, while leaving out all accents, indicating the oncoming accentuation of a next-following item.

Of course, the list of dynamic pitch patterns may be expanded or kept more limited. In the table hereinafter, all items S have a horizontal strike mark -.

Figure 4A:
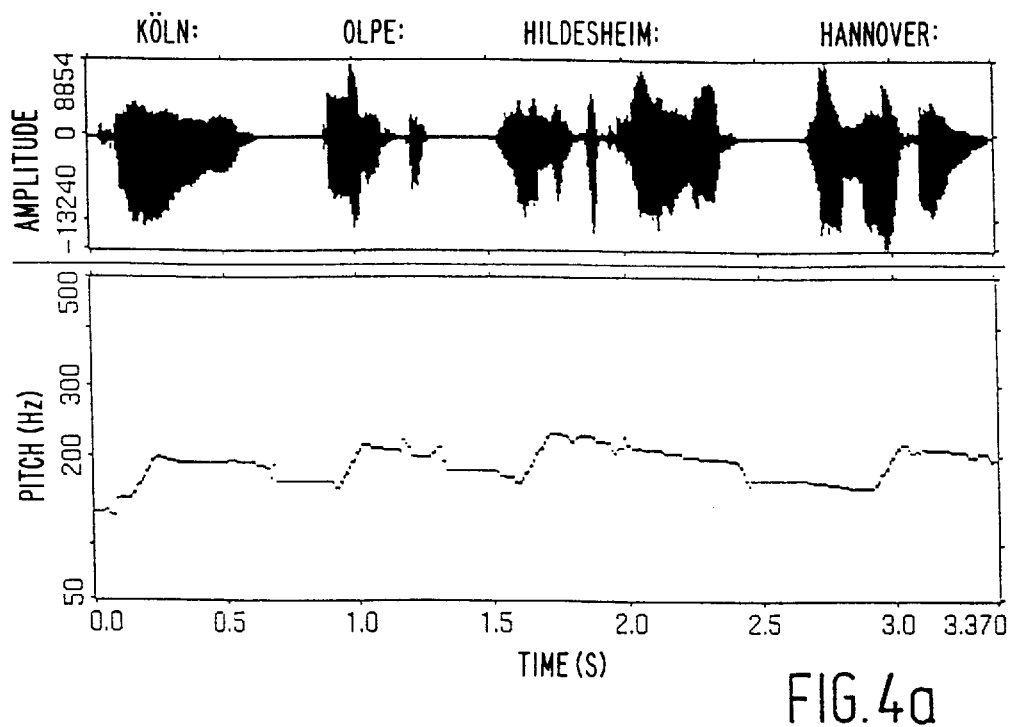
FIG. 4a–4j a set of standard patterns of pitch/intonation and prosody.

FIG. 4a illustrates the usage of the semi-colon, wherein a series of four German names of cities has been represented: Köln, Olpe, Hildesheim, and Hanover. The upper trace shows the time-varying amplitude signal, indicating actual positions of the sound in time. The lower trace the pitch variation with time. Herein, a striking aspect of all four representations is that the pitch has a sharp rise during the stressed part of the name, and thereafter remains relatively until the end of the word. Exclusively for Hanover, the stressed syllable is the second one.

Figure 4B:
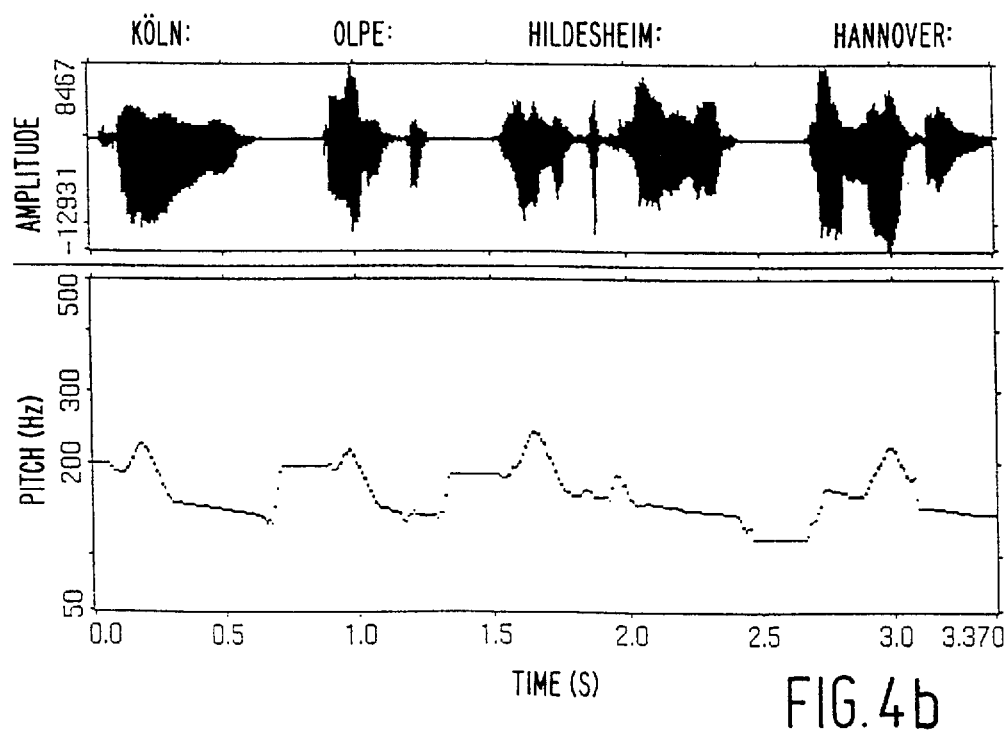

FIG. 4b illustrates the usage of the full-stop for the same series of four German city names. Herein, a striking aspect of all four representations is that during the stressed syllable, the pitch has first a rise, and then a sharp fall; thereafter, it remains relatively low.

Figure 4C:
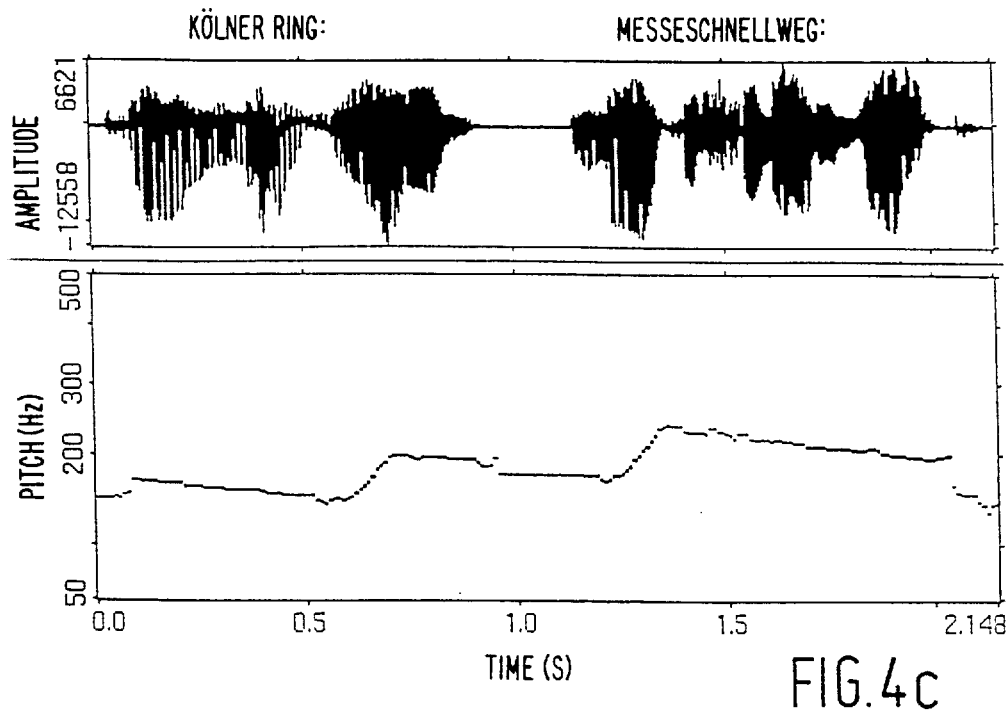
Figure 4D:
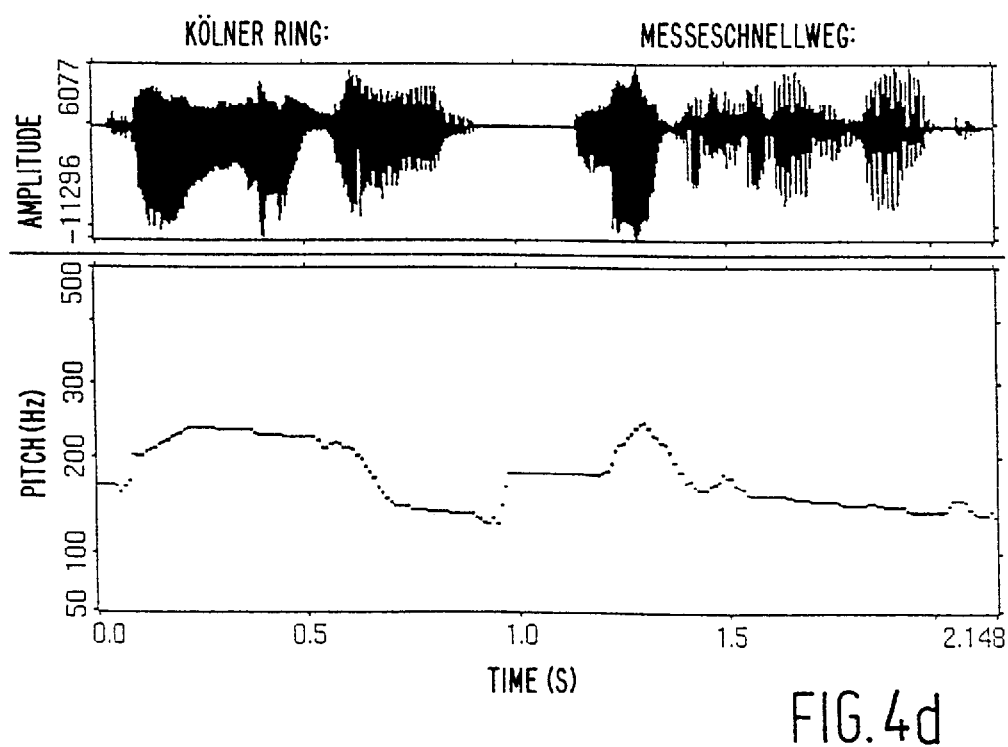

FIGS. 4c and 4d show the same with respect to the semi-colon : and full-stop , respectively, for two more complex speech items: "Kölner Ring" and "Messeschnellweg" (Fair express way). Herein, the first name has two accented syllables, one for each word. Now, in the semi-colon version only the second accent on "Ring" is represented by a pitch rise. In the full-stop version both accented syllables are represented by a pitch rise on Köln and a final fall on "Ring"; these two accents are clearly separated in time.

Figure 4E:
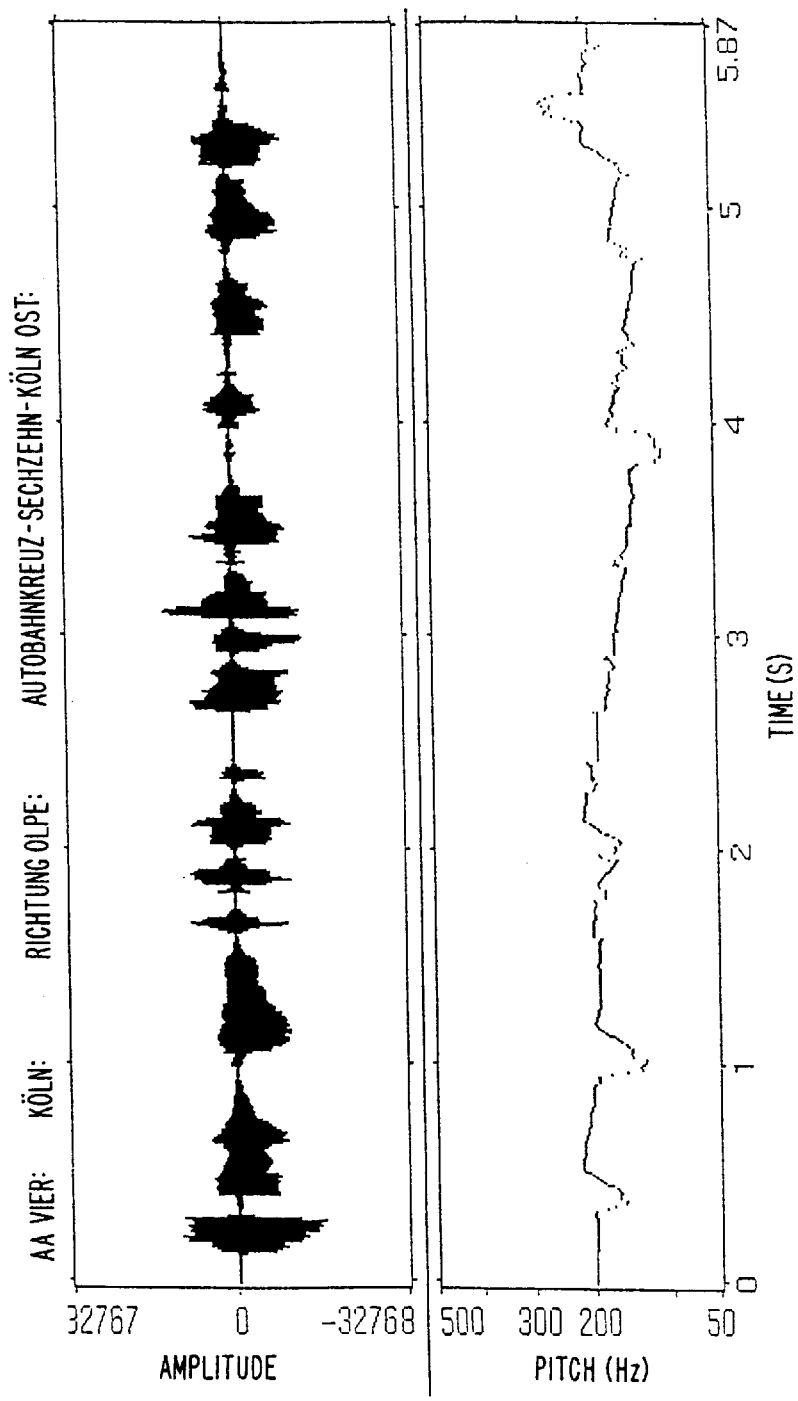

FIG. 4e shows a longer message: "AA vier: Köln: Richtung Olpe: Autobahnkreuz- Sechzehn- KÖln- Ost:" meaning "on highway from K to 0 at crossing point 16 (near) Köln east". The further content of the message has been suppressed. The effects discussed supra are visible here again.

Figure 4F:
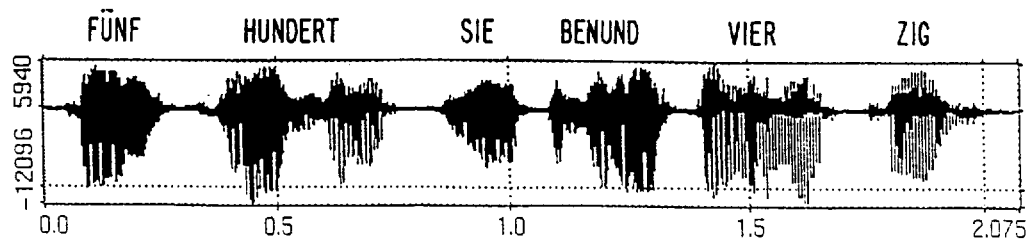
Figure 4G:
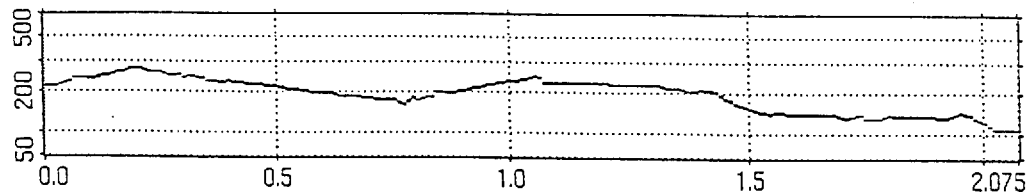
Figure 4H:
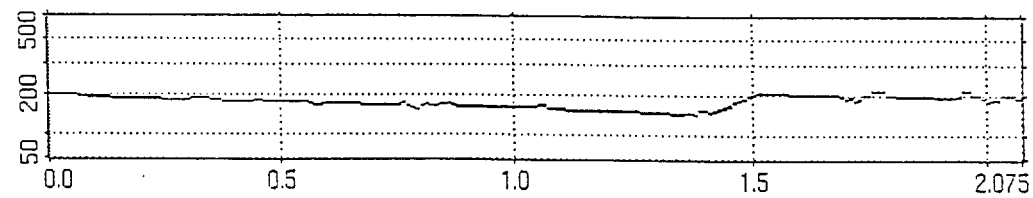
Figure 4I:
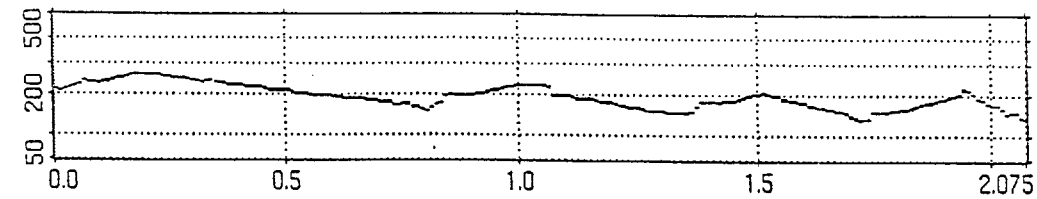
Figure 4J:
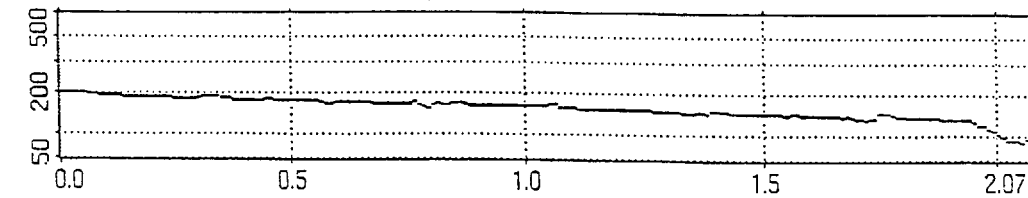

FIGS. 4f–4j show various representations of a complex number "fünfhundert-sieben-und-vierzig" (547). FIG. 4f shows the sound amplitudes in time. Next, FIG. 4g shows the version of the pitch with the full stop aspect. A clear final fall of the pitch is visible on the accented syllable in "vierzig". FIG. 4h has the semi-colon aspect. Here, a clear final rise (at 1.5) in pitch is visible. FIG. 4i has the aspect of the comma. Here, an extra 'final' rise is present on the unaccented syllable "zig" of "vierzig". FIG. 4j has the aspect of the horizontal strike. Here, all accent lending pitch variation is absent.

FIG. 5 is a table of various exemplary messages. First, various items of the messages like r, z, u, and event are coded in enriched phoneme notation. The set of event items is relatively large, however, for better recognition the extra storage space has been considered acceptable. The prosody of these items copies natural prosody. The r, z, u items occur relatively frequently, so that recognition by a person thereof is largely intuitive. Moreover, they are not very critical against misrecognition, because such misrecognition would most often not keep the driver from making a correct judgement. As regarding the events, it has been found that these contain relatively much linguistic redundancy. As a rough measure for the various types of storage required, the following is given for comparison. Storage as audio waveform requires about 10 kbit per second, which has not been used in the invention. Storage of parameters for therefrom generating synthetic speech is about 100 times more economical, in the range of 60 bits per second. Additionally, storage of interval duration and pitch contour requires a fixed amount of about 500 bits: this latter system is used for the fixed-contour items.

The following is a limited list of such fixed items:

r Direction or silence (pause)

z Between i In the region of u Deviation (not in the example of FIG. 5) event "event" is an event or situation that is relevant for road users. In fact, the item "event" is many-valued, inasmuch as various different events may be relevant in a particular context. The total number of events may be small or large (up to, e.g. several thousand), depending on the intended sophistication of the system. Indeed, certain events can consist of a string of words or even phrases. Certain events too, can have an open slot to be filled in, such as by a quantizer indicating for example, the length or duration of a traffic jam. In the embodiment, the "event" items are represented in enriched phoneme notation.

FIG. 5 in addition has a number of slot fillers that are coded in straight phoneme notation and use context sensitive prosody. In particular, the number of geographical location names is too large for allowing the storage as waveforms. The amount of numbers is less, but here the same approach has been taken as for the names.

| | |
|---|---|
| L Number | versions L- L: L. |
| N Location name | versions N- N: N. |
| Rt Road type | only version Rt- has been used |
| Rn Road name | only version Rn. has been used |
| S | Subtype (crossroad, triangle, connection, roadhouse . . .) only version S- has been used |

In the exemplary table, the comma (,) has not been used. The other suffixes '-' (strike), ':' (colon), and '.' (period) have been discussed with reference to FIGS. 4a–4j. As used in the preferred embodiment, these context-sensitive prosody items are used in the first place for improving the recognition of critical items such as geographical names and numbers. In fact, these items have a wide variation in content, but many probable interchange pairs are present in a given situation, such as names of towns that differ only by one letter, or are even identical, so that an extra indication must be provided thereafter, such as the associated province or state. Moreover, the fact that many of these items occur only rarely, makes them even more difficult to recognize by a driver person. Moreover, it has been found that providing these items with an almost natural prosody makes the messages more agreeable to a user.

Location sensitive carriers are messages wherein various locations, road identifiers, and numbers may be inserted. The carrier may comprise a series of slot labels that each need filling, and sometimes additional terms that are not part of the foregoing definitions. Event sensitive carriers are messages wherein the situation is the mainstay of the message, and only a few relatively short fillers according to the above are required. Of course, in addition to the above, various messages that are unrelated to the traffic proper may be rendered insertable, such as advertisements, government warnings and the like. Altogether, in a prototype system several hundred carrier messages have been defined, of which only a limited set has been presented for information. The traffic specialist will be able to supplement other messages according to need.

FIG. 5 contains 36 messages that cover nearly every situation. For example, the last message may read like: "on highway number A <name> at location B direction C between crossing <number> D and crossing <number> E a particular <event> has occurred." In the broadcast, messages are transmitted as a string of codes. For example, the last message number 40 is decoded according to: first the message number, then all location slot fillers (in this case Rt, N, Rn, L, L, S, N, L, S, N, L) terminated by the event code, possibly supplemented by one or more quantifiers for the event. Herein, the items N, L, S are coded as numbers; in a particular message they may be mutually unique, but this is not an express restriction. The message number may be supplemented by additional qualifiers, such as one that indicates the geographical area to which the message pertains, which qualifier may be used by the decoding system for deciding on whether the message is to be outputted or not. The prosody indicators shown in FIG. 5 are generally not transmitted, because for each message type the prosody for a particular entry in the table is independent of the identity of the item in question. In situations where the message structure is less definite, it may be necessary to transmit a slot filler item together with a prosody code. In a more compact notation, the items Rt, Rn may be implicit in the coded representation of the message already.

The phoneme notations of the locations have been provided with word accents; from these, the various context-dependent versions of the locations are derived.

I claim:

1. A device for generating speech message information, said device comprising input means for receiving fixed-format and coded control information elements, a storage unit for storing synthetic speech information items that are selectable in sequence by said coded control information elements, and a speech generator for under control of said speech information items generating a composite speech message, characterized in that for a message format containing both fixed items and variable items, such fixed items are encoded in enriched phoneme notation and each variable item is encoded as straight phoneme notation, together with lexical accents, and a particular pattern of timing and prosody for at least one variable item is selectable from a set of standard patterns in dependence solely upon a context of the variable item indicated by a multivalued context symbol adjoined to or implicit in an associated control information element.

2. A device as claimed in claim 1, wherein said input means comprise broadcast reception means, and said fixed-format control elements are represented by a message code and one or more code items respectively indicating all said variable items in the message.

3. A device as claimed in claim 2, for representing traffic information messages in a vehicle, said device furthermore having selection means for selectively, under control of an actual vehicle state, selecting among said messages to be generated or suppressed.

4. A vehicle provided with a device for generating speech message information, the vehicle comprising broadcast means for receiving fixed-format and coded control information elements, a storage unit for storing synthetic speech information items that are selectable in sequence by said coded control information elements, and a speech generator for under control of said speech information items generating a composite speech message, characterized in that for a message format containing both fixed items and variable items, such fixed items are encoded in enriched phoneme notation and each variable item is encoded as straight phoneme notation, together with lexical accents, and a particular pattern of timing and prosody for at least one variable item is selectable from a set of standard patterns in dependence solely upon a context of the variable item indicated by a multivalued context symbol adjoined to or implicit in an associated control information element.

5. A vehicle as claimed in claim 4, wherein said storage unit comprises a storage carrier that can reversibly be joined with said device, as accommodating at least all actual said variable message items.

6. An encoding device for encoding a composite speech message for transmitting for controlling the generating of speech message information, under control of fixed-format and coded control information elements, by means of a storage unit for storing synthetic speech information items that are selectable in sequence by said coded control information elements, for ultimate representation as a composite speech message, characterized in that for a message format containing both fixed items and variable items, the fixed items are encoded in enriched phoneme notation and each variable item is encoded in straight phoneme notation, together with lexical accents, and a particular pattern of timing and prosody for at least one variable item is selectable from a set of standard patterns in dependence solely upon a context of the variable item indicated by a multivalued context symbol adjoined to or implicit in an associated control information element.

7. A device as claimed in claim 1, for representing traffic information messages in a vehicle, said device furthermore having selection means for selectively, under control of an actual vehicle state, selecting among said messages to be generated or suppressed.

8. A device as claimed in claim 1, wherein said storage unit comprises a storage carrier that can reversibly be joined with said device, as accommodating at least all actual said variable message items.

* * * * *